(12) United States Patent
Pirzada et al.

(10) Patent No.: US 7,570,972 B2
(45) Date of Patent: Aug. 4, 2009

(54) SCHEME AND ALGORITHM TO FORM DIRECT LINKS

(75) Inventors: Fahd Pirzada, Austin, TX (US); Liam B. Quinn, Leander, TX (US); Chad P. Roesle, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 775 days.

(21) Appl. No.: 10/958,506

(22) Filed: Oct. 5, 2004

(65) Prior Publication Data

US 2006/0073847 A1      Apr. 6, 2006

(51) Int. Cl.
*H04M 1/00* (2006.01)
*H04B 7/00* (2006.01)
(52) U.S. Cl. .................................. 455/556.2; 455/41.2
(58) Field of Classification Search ................. 455/41.2, 455/450, 454, 502, 552.1, 556.1, 556.2, 436; 370/324, 350, 503, 311
See application file for complete search history.

(56) References Cited

U.S. PATENT DOCUMENTS

| | | | |
|---|---|---|---|
| 6,571,103 B1 * | 5/2003 | Novakov | 455/41.2 |
| 6,763,483 B2 | 7/2004 | Penick et al. | |
| 6,778,844 B2 | 8/2004 | Hood, III | |
| 6,795,688 B1 * | 9/2004 | Plasson et al. | 455/41.2 |
| 6,957,069 B2 * | 10/2005 | Shah et al. | 455/436 |
| 2005/0063328 A1 * | 3/2005 | Dunagan et al. | 370/324 |
| 2005/0239497 A1 * | 10/2005 | Bahl et al. | 455/552.1 |
| 2006/0019673 A1 * | 1/2006 | Yagyu et al. | 455/454 |

* cited by examiner

*Primary Examiner*—Quochien B Vuong
(74) *Attorney, Agent, or Firm*—Haynes and Boone, LLP (57) ABSTRACT

In a wireless network having an access point (AP) station and a first client station communicating over a selectable channel, the first client station includes a memory operable to store parameters corresponding to a mode of operation of the first client station. Infrastructure parameters correspond to an infrastructure mode and ad-hoc parameters correspond to an ad-hoc mode. The first client station includes a control device operable to switch the mode of operation in response to a request. The control device switches the first client to operate in the ad-hoc mode using the selectable channel while maintaining association with the AP in the infrastructure mode. Switching the mode includes writing the infrastructure parameters to the memory and reading the ad-hoc parameters from the memory.

15 Claims, 5 Drawing Sheets

SCHEME AND ALGORITHM TO FORM DIRECT LINKS

BACKGROUND

The present disclosure relates generally to information handling systems, and more particularly to portable information handling system components such as notebook computers, personal digital assistants (PDA's), cellular phones and gaming/entertainment devices capable of communicating over wireless media.

As the value and use of information continues to increase, individuals and businesses seek additional ways to acquire, process and store information. One option available to users is information handling systems. An information handling system ('IHS') generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Presently, use of wireless local area networks (LAN's) has experienced rapid growth since wireless technology when used with portable IHS devices combine information accessibility with user mobility. Many of these IHS's, especially the portable ones, typically use various wireless peripheral devices such as radios and wireless network interface cards (NIC's) to communicate between themselves and/or with other wired or wireless networks, including intranets and the Internet.

Multiple technological standards may be adopted for use in wireless networks. For example, IEEE 802.11, Bluetooth, Global System for Mobile Communications (GSM), and Infrared Data Association (IrDA) are widely accepted standards for wireless communications. Regardless of the standard used, wireless devices typically operate in certain pre-defined frequency spectrum. The IEEE 802.11 standard, for example, permits devices to establish either peer-to-peer (P2P) networks or hierarchical networks based on fixed access point (AP) devices, which provide network access to wireless client devices.

Figure 1A:
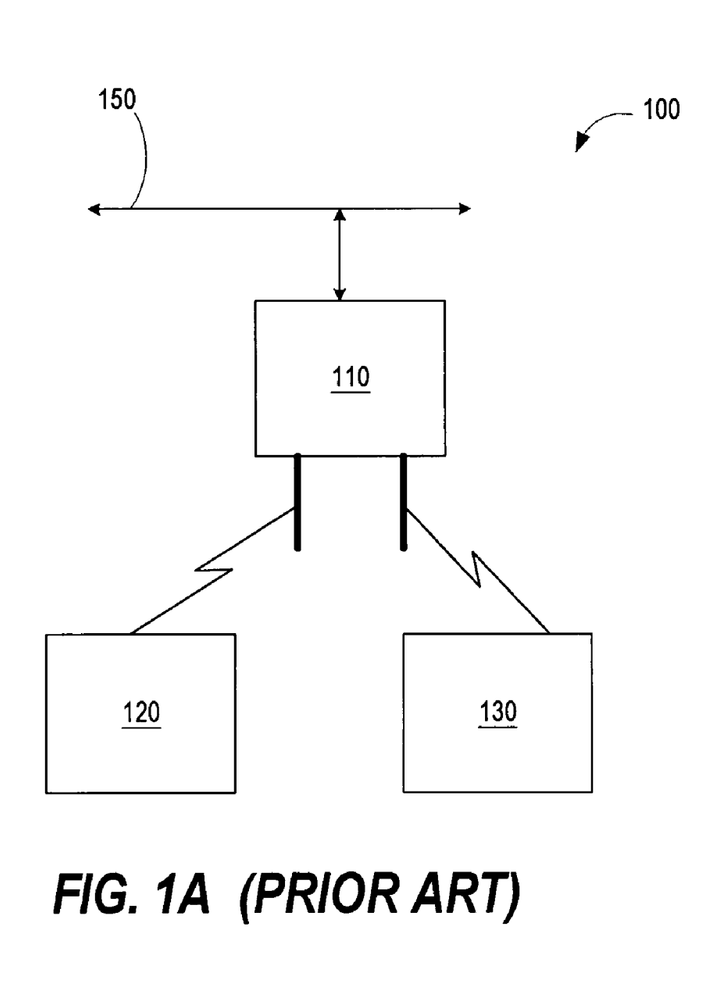
FIG. 1A illustrates a prior art wireless network architecture based on the IEEE 802.11 standard, described herein above.

FIG. 1A illustrates a block diagram of an IEEE 802.11 standard based wireless network 100, according to prior art. The wireless network 100 includes an access point (AP) 110 (also referred to as a base station), a first client station 120 and a second client station 130, with each station (STA) capable of communication with another station via wireless communication media such as radio. As is well known, each client station may be operated in one of multiple modes of operation such as an infrastructure mode and an ad-hoc mode. That is, compliance with the IEEE 802.11 standard typically requires that the client station 120 or 130 have only one active mode of operation at a time.

The network 100 is described as a basic service set (BSS) wireless network, which includes the AP 110 supporting one or more wireless client stations such as stations 120 and 130. The BSS may also be referred to as an infrastructure wireless network. In the infrastructure mode of operation, the AP 110 acts as a 'hub' device that connects one or more wireless communication devices together to create a wireless network. The AP 110 acts as the network's arbitrator, negotiating when each client station 120 or 130 may transmit.

The AP 110 may be connected to a wired network 150 to provide bridge functionality for relaying information between stations on each side. The AP 110 may communicate with multiple client stations located within a communications range of the wireless media. For example, certain types of wireless radios may be able to communicate anywhere within a range varying from about 50 to about 5000 feet with the use of special antennas. However, the specific communication range may vary with the standard used and the type of radio devices deployed.

Figure 1B:
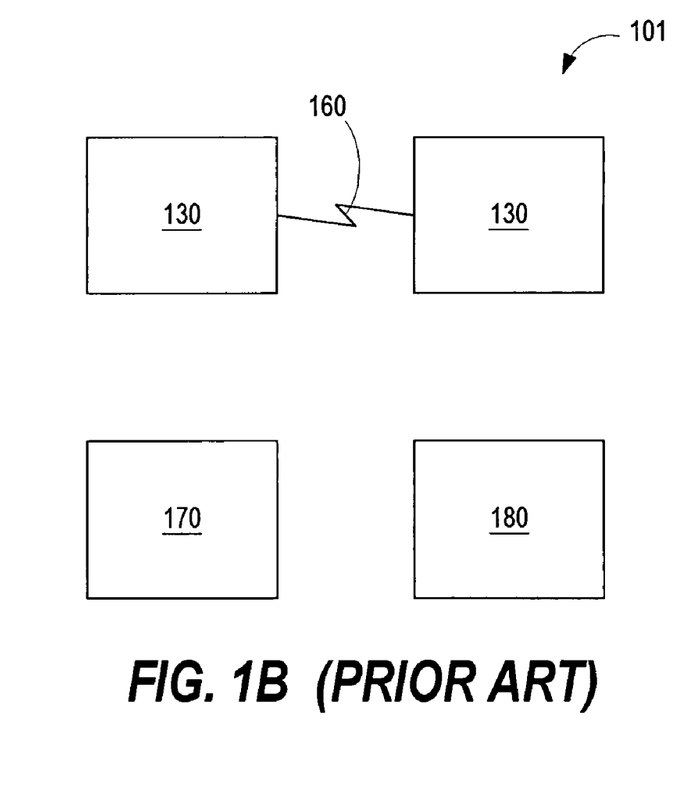
FIG. 1B illustrates a prior art wireless network architecture based on the IEEE 802.11 standard, described herein above.

FIG. 1B illustrates a block diagram of an IEEE 802.11 standard based wireless network 101, according to prior art. An independent basic service set (IBSS) network 101 includes at least two stations such as client stations 120 and 130 communicating directly with each other via a direct communication link 160. The IBSS network 101 is also sometimes referred to as an ad-hoc or peer-to-peer wireless network. In the ad-hoc mode of operation, a client station pair, such as the first and second client stations 120 and 130, establishes the direct link 160 without the participation of the AP 110 (not shown). Other client stations 170 and 180 may be included in the network 101. However, only one client station pair may directly communicate at a time.

Referring back to FIG. 1A, bandwidth of wireless media is often a bottleneck, especially compared to wired media. Present scheme to share multi-media content and/or large information files within the network 100 require uploading of the information from a source client station to the AP 110 and subsequent download from the AP 110 to a target client station. This scheme requires twice the bandwidth compared to a direct communication link between the source and target client stations. Switching between the infrastructure mode and the ad-hoc mode to optimize bandwidth may be possible but it requires time-consuming client station re-configuration. Also, the switching is typically not automatic and/or transparent to the user and hence is not practical.

Emerging wireless standards such as IEEE 802.11e are developing techniques to enable direct communication between two client stations, while operating in an infrastructure mode. However, these emerging standards presently require that the AP 110 be upgraded to be in compliance with the emerging standard. As such, IEEE 802.11 standard based legacy wireless networks may not be compatible with these techniques without a significant and costly upgrade.

Therefore, a need exists to provide an improved method and system for efficiently communicating information between client stations in a wireless network. More specifically, a need exists to provide an improved scheme to share information between source and target client stations, while the source client station is associated with the AP in the infrastructure mode. Additionally, a need exists for the AP to maintain compatibility with standard based legacy wireless networks. Accordingly, it would be desirable to provide an improved scheme to optimize bandwidth of a wireless network, absent the disadvantages found in the prior methods discussed above.

SUMMARY

The foregoing need is addressed by the teachings of the present disclosure, which relates to a system and method for switching communicating modes of operation of an IHS. According to one embodiment, in a wireless network system having an access point (AP) station and a first client station communicating over a selectable channel, the first client station includes a memory operable to store parameters corresponding to a mode of operation of the first client station, wherein first parameters correspond to a first mode and second parameters correspond to a second mode. The first client station includes a control device operable to switch the mode of operation in response to a request. The control device switches the first client to operate in the second mode using the selectable channel while maintaining association with the AP in the first mode. Switching the mode includes writing the first parameters to the memory and reading the second parameters from the memory.

Several advantages are achieved by the method and system for improving bandwidth in a wireless network according to the illustrative embodiments presented herein. The embodiments advantageously provide for an improved technique for switching the mode of operation of client stations, while maintaining association with the AP, thereby improving the bandwidth utilization of wireless networks. In addition, the technique is advantageously compatible with legacy versions of the AP and no costly upgrades are necessary.

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices or components described herein may be implemented as hardware (including discrete components, integrated circuits and systems-on-a-chip), firmware (including application specific integrated circuits and programmable chips) and/or software or a combination thereof, depending on the application requirements.

Communicating information between client stations in a wireless network typically requires the use of an access point station as an intermediary device. This effectively utilizes twice the bandwidth compared to a direct connection between the two client stations. Proposed emerging standards to accomplish a direct connection requires significant and costly upgrades to the wireless network. An improved method and system for efficiently communicating information between client stations in a wireless network may address both of these problems. In the improved method and system, a scheme is developed to save and restore mode of operation related parameters thereby enabling switching of modes while maintaining association with the access point.

According to one embodiment, in a wireless network having an access point (AP) station and a first client station communicating over a selectable channel, the first client station includes a memory operable to store parameters corresponding to a mode of operation of the first client station. Infrastructure parameters correspond to an infrastructure mode and ad-hoc parameters correspond to an ad-hoc mode. The first client station includes a control device operable to switch the mode of operation in response to a request. The control device switches the first client to operate in the ad-hoc mode using the selectable channel while maintaining association with the AP in the infrastructure mode. Switching the mode includes writing the infrastructure parameters to the memory and reading the ad-hoc parameters from the memory.

Figure 2:
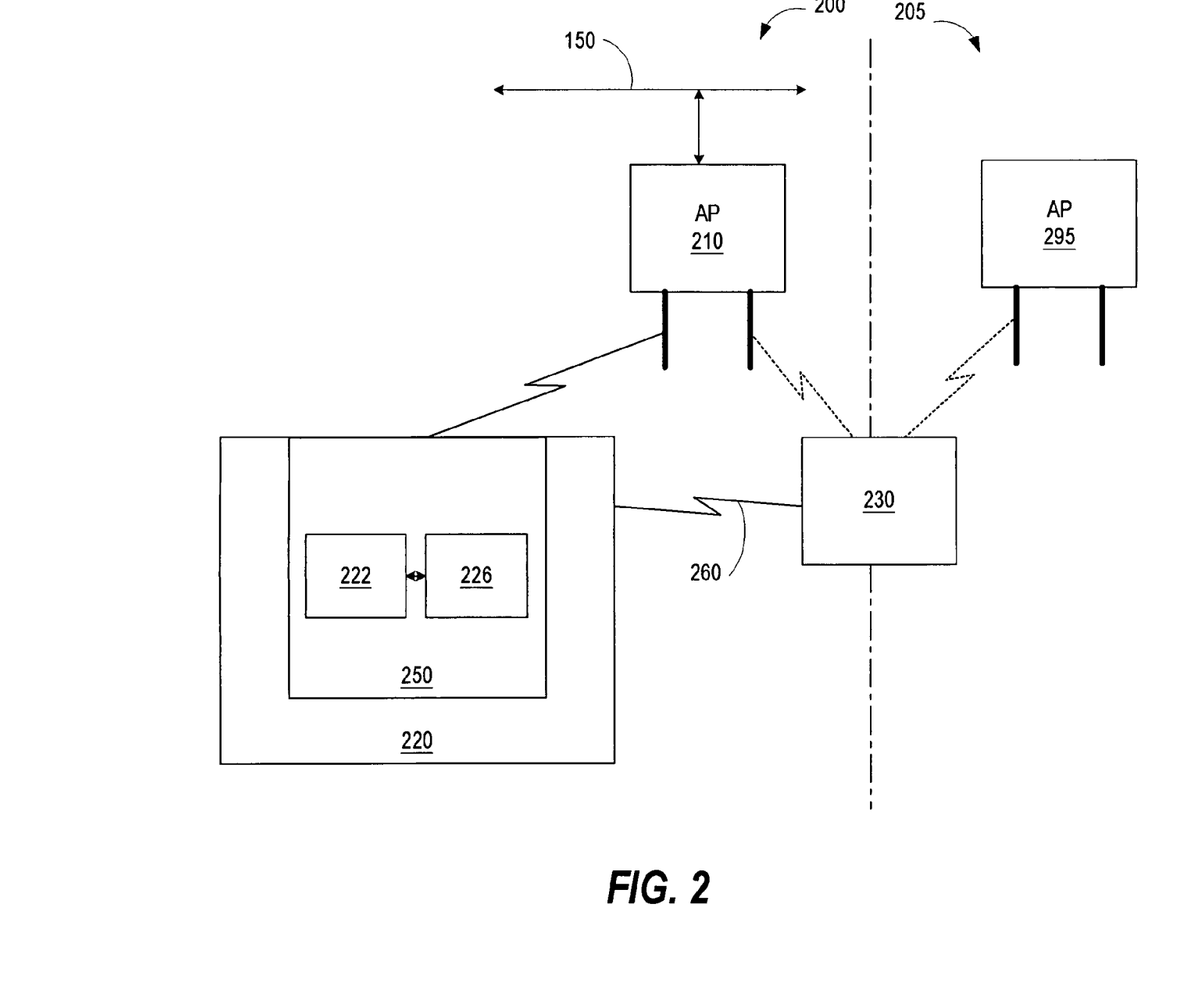
FIG. 2 illustrates a block diagram of a wireless network having improved client stations, according to one embodiment.

FIG. 2 illustrates a block diagram of a wireless network 200 having improved client stations, according to one embodiment. The wireless network 200 includes an access point (AP) 210 (also referred to as a base station) and at least one client station configured to operate in an infrastructure mode. In one embodiment, the at least one client station includes a first client station 220 communicating with the AP 210 via a communications device such as a radio 250. The AP 210 may be connected to the wired network 150 to provide bridge functionality for relaying information between stations on each side. The communication within the network 200 takes place via a selectable channel in accordance with the standards.

In one embodiment, the first client station 220 is operable to directly communicate in an ad-hoc mode with a second client station 230 via a direct communications link 260. The link 260 is established via the radio 250, using the selectable channel. By having the first and second client stations 220 and 230 use the same selectable channel, the first client station 220 advantageously ensures that it does not miss any communications with the AP 210, and vice versa. In one embodiment, a different non-overlapping channel other than the selectable channel may be used to increase the bandwidth efficiency. In this embodiment, however, there is a finite possibility that some communications with the AP 210 may be missed. In one embodiment, the AP 210 is compliant with the IEEE 802.11 wireless standard communicating at a specified rate between 1 to 108 megabits per second, based on current implementation, with the client stations within the network 200. These rates may be scaled higher with ongoing improvements in the standards.

In one embodiment, the second client station 230 is located within a communicable range of the radio 250. In this embodiment, the second client station 230 may or may not be included in the same network as the first client station 220. That is, the second client station may be associated with AP 210 and be a part of the network 200, or it may be operable as a standalone station, or it may be a part of another network such as network 205 having AP 295.

Improved client stations such as the first and second client stations 220 and 230 include a scheme to save and restore mode of operation related parameters (also referred to as context sensitive parameters) thereby enabling switching of modes while maintaining association with the AP 210. That is, the improved client stations 220 and 230 enable each client station to maintain context sensitive parameters for performing substantially concurrent operation in multiple modes.

In one embodiment, the radio 250 includes a memory 222 and a control device 226. In one embodiment, the memory 222 and the control device 226 may be included in the first client station 220 but is external to the radio 250. The memory 222 is operable to store parameters corresponding to a mode of operation of the radio 250 and hence of the first client station 220. The size of the memory 222 is selected to be sufficiently large to store all parameters.

The parameters include infrastructure parameters corresponding to an infrastructure mode of operation and ad-hoc parameters corresponding to an ad-hoc mode of operation. In one embodiment, the infrastructure parameters may include service set identifier (SSID), operating mode, transmit rate, channel, receiver media access control (MAC) address, beacon interval, power mode, authentication and security. Each of the infrastructure parameters may have an assigned, configured, computed, default or initial value. Some of these values may be defined during a configuration process of the radio 250. Examples of values for each of the infrastructure parameters may include: SSID=BLDG_1, operating mode=INFRASTRUCTURE, transmit rate=11 mbps, channel=11, receiver MAC address=12:34:56:78:9A:BC, beacon interval=10 milliseconds, power mode=ACTIVE, authentication and security=SHARED_KEY. The specific values are dynamic and vary with time. The specific list or set of infrastructure parameters, which are used to fully define the infrastructure context, may vary with the functionality of the AP 210. For example, additional infrastructure parameters may include: arbitration inter frame space (AIFS) and contention window size.

In one embodiment, the ad-hoc parameters may be substantially similar to the infrastructure parameters, except for the values of the parameters. For example, the value of the SSID parameter is different and the operating mode is set to AD_HOC. In the ad-hoc mode, the receiver address is modified from the AP 210 to a target client station. In this embodiment, the first client station 220 uses the same selectable channel, e.g., channel=11, for AP as well as peer-to-peer communication.

A control device 226 is operable to detect a request for communicating directly with another client station such as the second client station 230. For example, the request may be in the form of a user input and/or software program request to share multi-media content and/or a large information file. In response to detecting the request, the control device 226 is operable to store (or write) the 'current' or 'snap-shot' values of the infrastructure parameters associated with the infrastructure mode in the memory 222. The 'current' or 'snap-shot' values may be copied or transferred from operating registers (not shown) of the radio 250. The control device 226 is operable to load initial values for the ad-hoc parameters stored in the memory 222 into the operating registers. Upon loading of the ad-hoc parameters from the memory 222, the first client station 220 switches its mode of operation to the ad-hoc mode, while preserving information associated with the infrastructure mode as infrastructure parameters in the memory 222. Thus, from the AP 210 perspective there is no change in the mode of operation of the first client station 220.

The switching to the ad-hoc mode also includes modifying certain fields included in a message. In the ad-hoc mode, the MAC layer packages the MAC service data units (MSDU's) with a header and trailer to form MAC protocol data units (MPDU's) that are passed on to the physical layer. The header field is modified to specify that the frame be intended for a client station rather than an AP. A subfield in the frame control field may be cleared to indicate a direct transfer between two clients stations 220 and 230. In addition, the address field is modified to indicate a client station instead of the AP 210. These changes are done/undone seamlessly with the change of context.

In the ad-hoc mode of operation, the first client station 220 establishes communications with the second client station 230 using a multi-phase communication procedure for peer-to-peer networks. In one embodiment, the same selectable channel is used for the peer-to-peer communication. Additional detail of communicating between the first and second client stations 220 and 230 is described in FIG. 3. Upon completion of the communication between the first and second client stations 220 and 230 and/or due to an interrupt request, the control device 226 loads the saved values of the infrastructure parameters in the memory 222 into the operating registers, thereby switching back to the infrastructure mode. The first client station 220 waits for further communications from the AP 210 in the infrastructure mode.

While in the ad-hoc mode, the control device 226 is monitoring for events within the first client station 220, which may require the interruption of the peer-to-peer communications. The scheme to save and/or restore the infrastructure parameters and the ad-hoc parameters advantageously enables the first client station 220 to switch between the two modes on an 'as needed' basis, while maintaining association with the AP 210 in the infrastructure mode.

Figure 3:
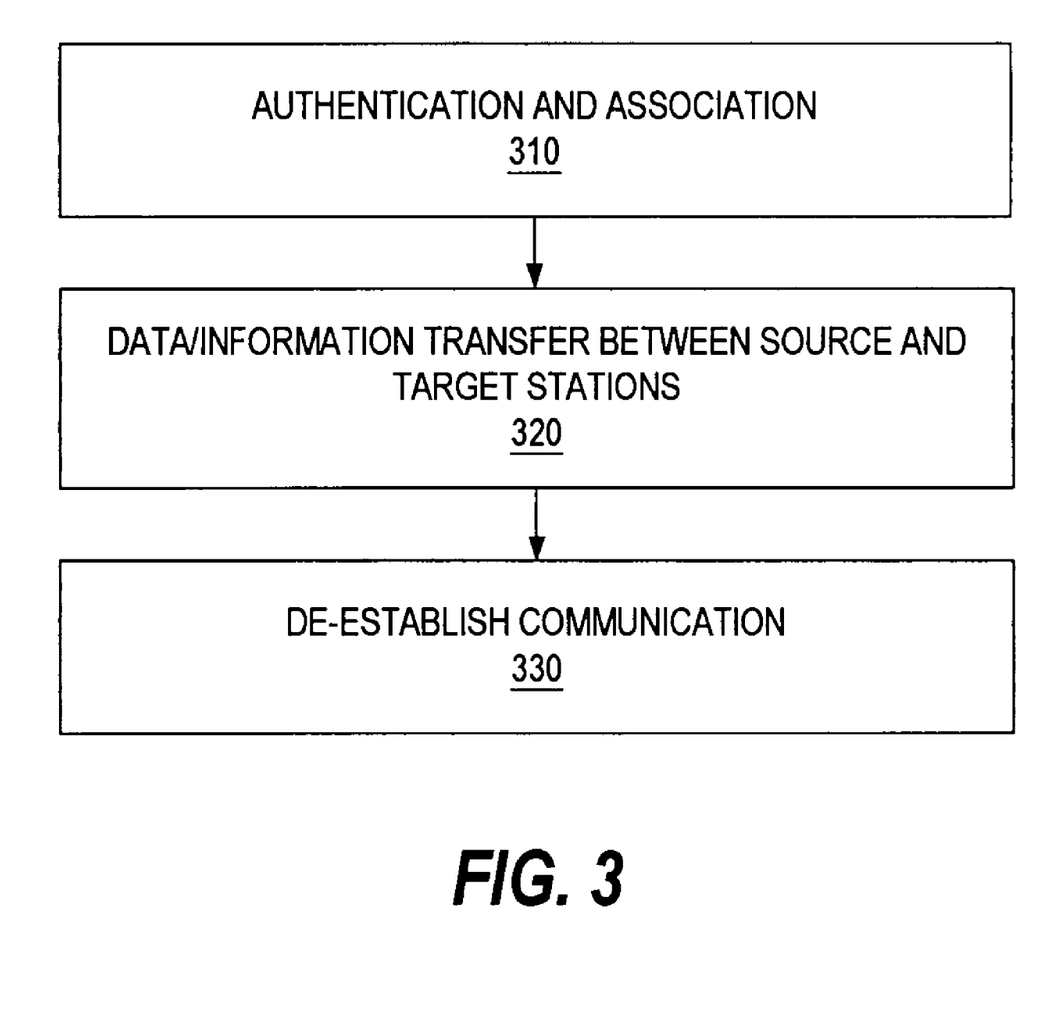
FIG. 3 illustrates a flow chart of a method for ad-hoc communication between two improved client stations, according to an embodiment.

FIG. 3 illustrates a flow chart of a method for ad-hoc communication between two improved client stations, according to an embodiment. When the first client station 220 switches to the ad-hoc mode, it uses a multi-step process to: 1) initially establish communication, 2) transfer data, and 3) de-establish the communication upon completion of the data transfer.

In step 310, the two client stations 220 and 230 establish authentication and association. The first client station 220 detects a request to make a file transfer to the second client station 230, which may or may not be located on the same network 200, but is within the communications range of the radio 250. The first client station 220 transmits a beacon frame with the optional Independent BSS field (indicating the ad-hoc mode) and an optional traffic indication map. The second client station 230 receives the beacon and issues a probe frame based on the information provided in the received beacon. The first client station 220 receives the probe frame and transmits the probe response. On reception of probe response, the second client station 230 completes the hand-shaking required to establish a reliable ad-hoc association while the first client station 220 remains in the infrastructure mode.

In step 320, data and/or information is transferred directly from a source client station (e.g., the first client station 220) to a target client station (e.g., the second client station 230). The data and/or information transferred may include large files such as multi-media content files.

In step 330, the first client station 220 de-establishes or tears down the communication upon completion. The first client station 220 determines that the data transfer in step 320 is complete and performs the switching from the ad-hoc mode to the infrastructure mode. At this point all ad-hoc parameters corresponding to the ad-hoc context mode may be erased or saved to the memory 222, and all saved infrastructure parameters are reloaded into the operating registers. The first client station 220 issues a probe request for the AP 210. The AP 210 issues a probe response to all clients within the network 200. If the second client station 200 is located on the network 200 it too receives the probe response. As described earlier, in addition to the completion of data transfer, the direct communication may also be interrupted due to an interruption-causing event. Various steps described above may be added, omitted, combined, altered, or performed in different orders.

Figure 4:
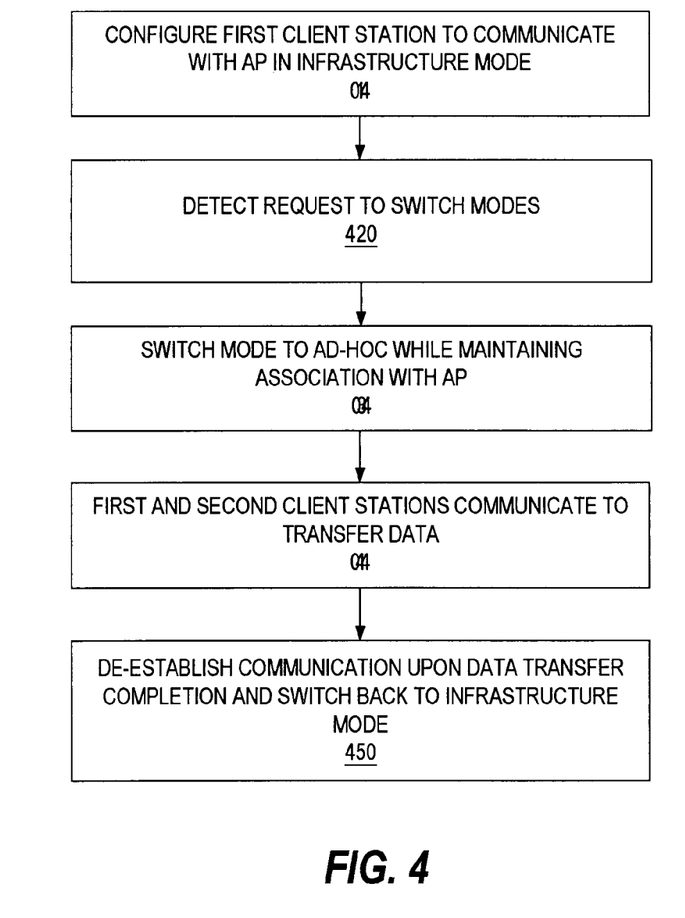
FIG. 4 illustrates a flow chart of a method for mode switching of a client station, according to an embodiment.

FIG. 4 illustrates a flow chart of a method for mode switching of a client station, according to an embodiment. In step 410, the first client station 220 is configured or set up to communicate via the selectable channel with the AP 210 in an infrastructure mode. In step 420, the first client station 220 detects a request to switch the mode of operation to an ad-hoc mode. In one embodiment, the request may be in the form of a user input and/or software program request to share multimedia content and/or a large information file, thereby establishing a need for direct communication with the second client station 230. In step 430, the first client station 220 switches its mode of operation to the ad-hoc mode, while maintaining association with the AP 210 in the infrastructure mode. This is accomplished by saving the current values of context sensitive infrastructure parameters to the memory 222 and loading initial values for the ad-hoc parameters from the memory 222. In step 440, the first client station 220 communicates with the second client station 230 using the selectable channel. In step 450, in response to a completion of the communication between the first and second client stations 220 and 230, the first client station 220 restores its mode of operation to the infrastructure mode by reloading the previously saved snap-shot values of the infrastructure parameters. Various steps described above may be added, omitted, combined, altered, or performed in different orders.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the IHS may be a personal computer, including notebook computers, personal digital assistants, cellular phones, gaming consoles, a network storage device, or any other suitable device and may vary in size, shape, performance, functionality, and price.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit communications between the various hardware components.

Figure 5:
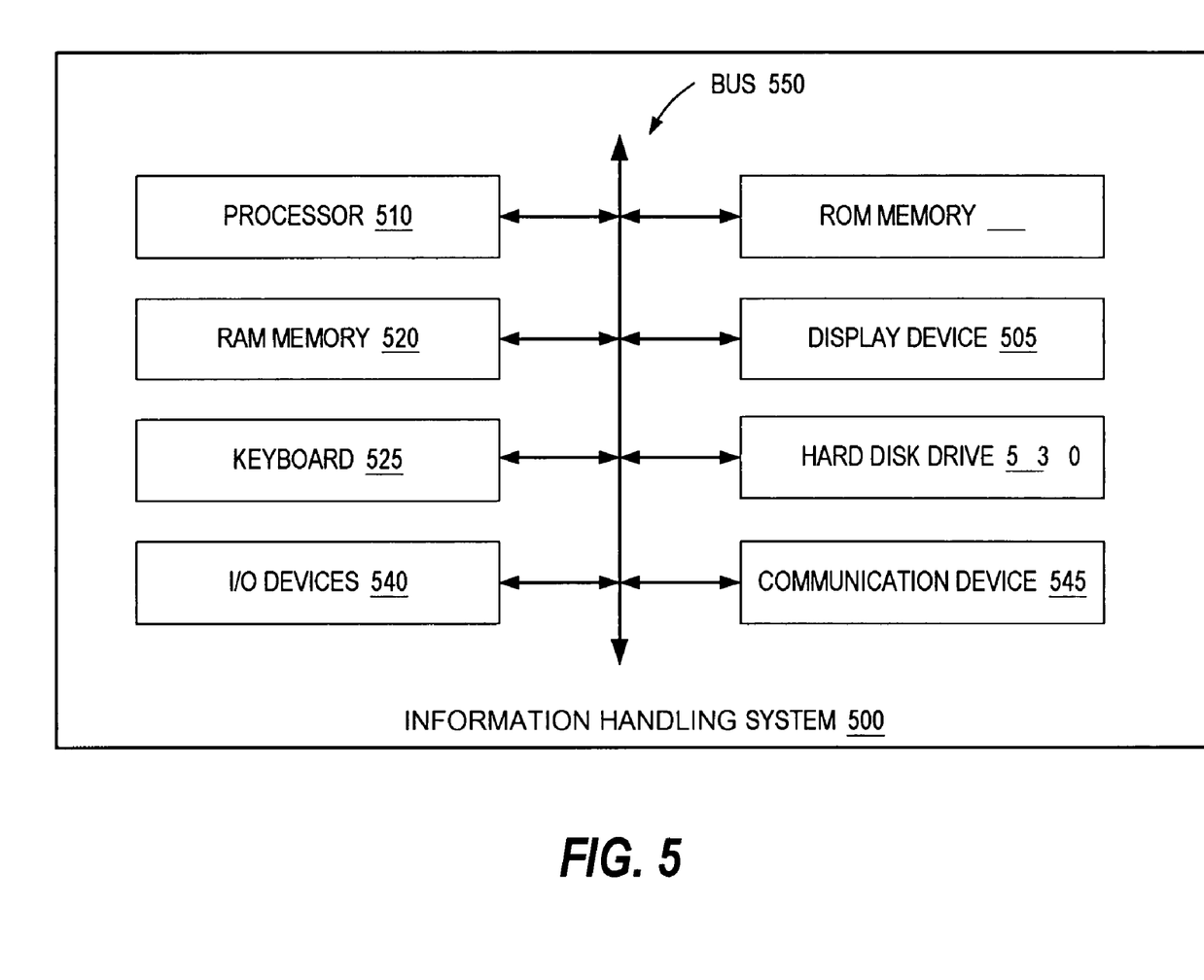
FIG. 5 illustrates a block diagram of an information handling system having an improved communications device, according to an embodiment.

FIG. 5 illustrates a block diagram of an information handling system 500 having an improved mode-switching scheme (not shown), according to an embodiment. The information handling system 500 includes a processor 510, a system random access memory (RAM) 520 (also referred to as main memory), a non-volatile ROM 522 memory, a display device 505, a keyboard 525 and an I/O controller 540 for controlling various other input/output devices. It should be understood that the term "information handling system" is intended to encompass any device having a processor that executes instructions from a memory medium. The IHS 500 is shown to include a hard disk drive 530 connected to the processor 510 although some embodiments may not include the hard disk drive 530. The processor 510 communicates with the system components via a bus 550, which includes data, address and control lines. In one embodiment, the IHS 500 may include multiple instances of the bus 550. A communications controller 545, such as a network interface card, may be connected to the bus 550 to enable information exchange between the IHS 500 and other devices (not shown). In one embodiment, the communications controller 545 is substantially the same as the radio 250 of FIG. 2.

In one embodiment, the improved first and second client stations 220 and 230 described in FIG. 2 are implemented as the IHS 500. In this embodiment, the radio 250, which is the communications device, is implemented as the communications controller 545.

The processor 510 is operable to execute the computing instructions and/or operations of the IHS 500. The memory medium, e.g., RAM 520, preferably stores instructions (also known as a "software program") for implementing various embodiments of a method in accordance with the present disclosure. In various embodiments the one or more software programs are implemented in various ways, including procedure-based techniques, component-based techniques, and/or object-oriented techniques, among others. Specific examples include assembler, C, XML, C++ objects, Java and Microsoft Foundation Classes (MFC).

Although illustrative embodiments have been shown and described, a wide range of modification, change and substitution is contemplated in the foregoing disclosure and in some instances, some features of the embodiments may be employed without a corresponding use of other features. Those of ordinary skill in the art will appreciate that the hardware and methods illustrated herein may vary depending on the implementation. For example, it should be understood that while switching of modes is described to be occurring between a first mode, e.g., an infrastructure mode, and a second mode, e.g., an ad-hoc mode, it would be within the spirit and scope to switch between any two operation modes of communication. A client station may switch seamlessly between two ad-hoc networks and/or between two infrastructure networks. Accordingly, it is appropriate that the appended claims be construed broadly and in a manner consistent with the scope of the embodiments disclosed herein.

What is claimed is:

1. A wireless network system having an access point (AP) station and a first client station communicating over a selectable channel, the first client station comprising:
   a memory;
   a plurality of wireless parameters corresponding to a plurality of wireless modes of operation of the first client station, wherein the plurality of wireless parameters comprise a plurality of infrastructure parameters that correspond to an infrastructure mode and a plurality of ad-hoc parameters that correspond to an ad-hoc mode; and
   a control device that is operable to switch the wireless mode of operation of the first client station in response to a request, wherein in response to a request to switch the wireless mode of operation from the infrastructure mode to the ad-hoc mode, the control device stores a current set of the plurality of infrastructure parameters in the memory, retrieves an initial set of the plurality of ad-hoc parameters from the memory, loads the initial set of ad-hoc parameters, and switches the wireless mode of operation of the first client station to the ad-hoc mode, wherein in response to a request to switch the wireless mode of operation from the ad-hoc mode to the infrastructure mode, the control device loads the current set of the plurality of infrastructure parameters stored in the memory and switches the wireless mode of operation of the first client station to the infrastructure mode and wherein operation in the infrastructure mode enables wireless communication between the AP and the first client station using the selectable channel and operation in the ad-hoc mode enables a direct wireless communication between the first client station and a second client station using the selectable channel.

2. The system of claim 1, wherein in response to the request to switch the wireless mode of operation from the infrastructure mode to the ad-hoc mode, the control device performs an ad-hoc modification to at least one message field that comprises a modification to a header field, a subfield, and an address field, and wherein in response to the request to switch the wireless mode of operation from the ad-hoc mode to the infrastructure mode, the control device performs an infrastructure modification to at least one message field that comprises a modification to a header field, a subfield, and an address field.

3. The system of claim 1, wherein the second client station is located within a communicable range of the first client station, wherein the first and second client stations are configured to be substantially similar.

4. The system of claim 1, wherein operation in the infrastructure mode disables a direct wireless communication between the first and second client station.

5. The system of claim 1, wherein the switch from the ad-hoc mode to the infrastructure mode occurs in response to a completion of a direct communication between the first and second client stations.

6. The system of claim 1, wherein the second client station is included in the network.

7. The system of claim 1, wherein the second client station is excluded from the network.

8. The system of claim 1, wherein the current set of the plurality of the infrastructure parameters include service set identifier (SSID), operating mode, transmit rate, channel, receiver media access control (MAC) address, beacon interval, and security, wherein the operating mode is set as the infrastructure mode.

9. The system of claim 1, wherein the initial set of the plurality of the ad-hoc parameters include service set identifier (SSID), operating mode, transmit rate, channel, receiver media access control (MAC) address, beacon interval, and security, wherein the operating mode is set as the ad-hoc mode.

10. The system of claim 1, wherein the loading of the initial set of ad-hoc parameters enables the ad-hoc mode.

11. The system of claim 1, wherein the AP is in compliance with the IEEE 802.11 wireless networking standard.

12. An information handling system (IHS) comprising:
a processor;
a communications device coupled to the processor and operable to communicate via a selectable channel with a wireless network having an access point (AP) station;
a memory coupled to the processor and the communications device;
a plurality of wireless parameters corresponding to a plurality of wireless modes of operation of the communications device, wherein the plurality of wireless parameters comprise a plurality of infrastructure parameters that correspond to an infrastructure mode and a plurality of ad-hoc parameters that correspond to an ad-hoc mode;
wherein the communications device is operable to switch the wireless mode of operation of the communications device in response to a request from the processor, wherein in response to a request to switch the wireless mode of operation from the infrastructure mode to the ad-hoc mode, the communications device stores a current set of the plurality of infrastructure parameters in the memory, retrieves an initial set of the plurality of ad-hoc parameters from the memory, loads the initial set of ad-hoc parameters, and switches the wireless mode of operation of the first client station to the ad-hoc mode, wherein in response to a request to switch the wireless mode of operation from the ad-hoc mode to the infrastructure mode, the control device loads the current set of the plurality of infrastructure parameters stored in the memory and switches the wireless mode of operation of the first client station to the infrastructure mode and wherein operation in the infrastructure mode enables wireless communication between the AP and the communications device using the selectable channel and operation in the ad-hoc mode enables a direct wireless communication between the communications device and a second IHS using the selectable channel.

13. The system of claim 12, wherein in response to the request to switch the wireless mode of operation from the infrastructure mode to the ad-hoc mode, the control device performs an ad-hoc modification to at least one message field that comprises a modification to a header field, a subfield, and an address field, and wherein in response to the request to switch the wireless mode of operation from the ad-hoc mode to the infrastructure mode, the control device performs an infrastructure modification to at least one message field that comprises a modification to a header field, a subfield, and an address field.

14. The system of claim 12, wherein the AP is in compliance with the IEEE 802.11 wireless networking standard.

15. The system of claim 12, wherein the processor switches the wireless mode of operation of the communications device from the ad-hoc mode to the infrastructure mode by reloading the current set of infrastructure parameters saved in the memory, the switch occurring in response to a completion of a direct wireless communication between the communications device and the second IHS.

* * * * *